US012669974B1

(12) United States Patent　　　　　(10) Patent No.:　US 12,669,974 B1

Henry et al.　　　　　　　　　　　　(45) Date of Patent:　Jun. 30, 2026

(54) SYSTEMS AND METHODS FOR CREATING CUSTOM AUDIO MIXES FOR ARTIFICIAL REALITY ENVIRONMENTS

(71) Applicant: Meta Platforms Technologies, LLC, Menlo Park, CA (US)

(72) Inventors: Colleen Kelly Henry, Oakland, CA (US); Caitlin O'Callaghan, Pacifica, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 299 days.

(21) Appl. No.: 18/171,993

(22) Filed: Feb. 21, 2023

(51) Int. Cl.
　　G06F 3/16　　　　(2006.01)
　　G02B 27/01　　　(2006.01)
(52) U.S. Cl.
　　CPC ........... G06F 3/162 (2013.01); G02B 27/017 (2013.01); G06F 3/165 (2013.01)
(58) Field of Classification Search
　　None
　　See application file for complete search history.

(56) References Cited

U.S. PATENT DOCUMENTS 7,558,224 B1 * 7/2009 Surazski ................ H04R 27/00
　　　　　　　　　　　　　　　　　　　　　370/352
2017/0123752 A1　5/2017 Nadler 2018/0341386 A1 * 11/2018 Inomata ................ A63F 13/211
2020/0360824 A1 * 11/2020 Fargo ........................ A63F 13/87
2022/0164161 A1 * 5/2022 Ogiso ..................... A63F 13/40
2023/0384592 A1 * 11/2023 Dorn ........................ G06F 3/011

OTHER PUBLICATIONS

European Search Report for European Patent Application No. 24157304.7, dated Jun. 28, 2024, 8 pages.

* cited by examiner

*Primary Examiner* — Hemant S Patel

(74) *Attorney, Agent, or Firm* — Greenberg Traurig, LLP

(57)　　　　　　ABSTRACT

A computer-implemented method for creating custom audio mixes for artificial reality environments may include identifying a plurality of artificial reality devices providing the same artificial reality environment, where each artificial reality device is operated by a different user and, for each artificial reality device, playing a custom audio mix by (i) identifying a first set of audio data to be included in the custom audio mix that includes audio generated by the artificial reality environment, (ii) identifying a second set of audio data to be excluded from the custom audio mix that includes audio input from at least one user, (iii) creating the custom audio mix by including the first set of audio data and excluding the second set of audio data, and (iv) playing the custom audio mix via at least one speaker of the artificial reality device. Various other methods, systems, and computer-readable media are also disclosed.

20 Claims, 7 Drawing Sheets

100

200

SYSTEMS AND METHODS FOR CREATING CUSTOM AUDIO MIXES FOR ARTIFICIAL REALITY ENVIRONMENTS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
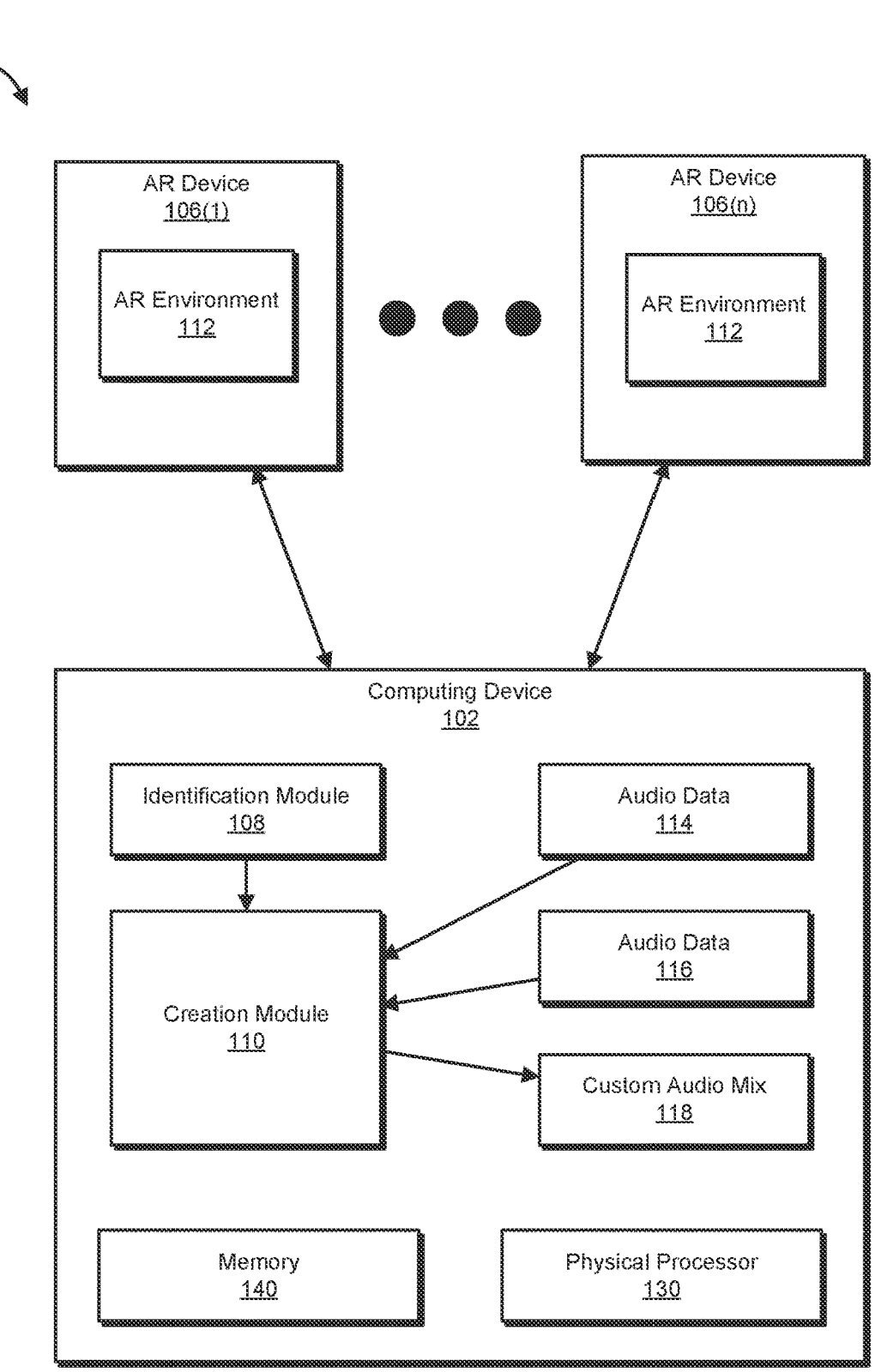
FIG. 1 is a block diagram of an exemplary system for creating custom audio mixes for AR environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

When multiple users in the same physical location are engaging with devices that produce the same audio, echoes and feedback are common problems. Though some level of solutions may exist for conference calls, where the only sound is typically that of the participants' voices, solutions do not exist for artificial reality (AR) environments, which may include not only other participants' voices but ambient audio from the environment, location-based audio triggered by AR objects, and/or various other types of audio. The present disclosure is generally directed to systems and methods for reducing the echo and feedback effects of multiple local users by creating a custom audio mix for each user that selectively includes and excludes specific sources of audio based on a variety of factors including the user's physical location, the user's relative positioning within the physical location, and/or the user's avatar's virtual positioning within the AR environment.

In some embodiments, the systems described herein may improve the functioning of a computing device by improving the ability of the computing device to provide the user with audio that does not cause echoing and/or feedback. Additionally, the systems described herein may improve the fields of AR gaming and/or other AR activities by enabling multiple users in the same location to participate in a shared AR activity without audio disturbances.

In some embodiments, the systems described herein may be installed on a computing device that communicates with wearable AR devices. Additionally or alternatively, the systems described herein may be installed on AR devices (e.g., in a distributed fashion). FIG. 1 is a block diagram of an exemplary system 100 for creating custom audio mixes for AR environments on a computing device. In one embodiment, and as will be described in greater detail below, a computing device 102 may be configured with an identification module 108 that may identify a plurality of AR devices 106(1)-(n) providing an AR environment 112, where each AR device 106(1)-(n) is operated by a different user. In one embodiment, computing device 102 may also be configured with a creation module 110 that may, for each AR device 106(1)-(n) providing AR environment 112, play a custom audio mix 118 by (i) identifying a first set of audio data 114 to be included in custom audio mix 118 that includes audio generated by AR environment 112, (ii) identifying a second set of audio data 116 to be excluded from custom audio mix 118 that includes audio input from at least one user, (iii) creating custom audio mix 118 by including audio data 114 and excluding audio data 116, and (iv) playing custom audio mix 118 for a user of the AR device via at least one speaker of the AR device.

Computing device 102 generally represents any type or form of computing device capable of reading computer-executable instructions. For example, computing device 102 may represent a personal computing device. In another example, computing device 102 may represent an AR hub or other specialized AR device. In some examples, computing device 102 may represent one or more of the AR devices playing the custom audio mix, such as an AR headset. Although illustrated as a single device, in some embodiments, computing device 102 may represent multiple devices (e.g., AR hubs in different homes, AR headsets worn by different users, etc.). Additional examples of computing device 102 may include, without limitation, a laptop, a desktop, a wearable device, a smart device, a personal digital assistant (PDA), etc.

AR environment 112 generally represents any type or form of three-dimensional virtual environment that includes audio data. In some examples, an AR environment may mimic an outdoor or indoor area, such as a field or a living room. In one example, an AR environment may have ambient audio effects, such as music or birdsong. In some examples, an AR environment may have location-based audio effects, such as a river that is louder if a user's avatar is nearby and/or triggered audio effects, such as a dog that barks when a user comes within range. In some examples, an AR environment may play other types of media with accompanying audio, such as an AR movie theater that plays a movie on a virtual screen and plays the accompanying audio track to the movie.

AR devices 106(1)-(n) generally represents any type of AR device that includes a speaker configured to play audio for a single user. For example, an AR device may include an over-the-ear headphone speaker as opposed to a sound bar that plays audio for multiple users. In some embodiments, an AR device may be a wearable device, such as a head-mounted display. For example, an AR device may be a headset or glasses. Additional examples and details of AR devices and AR environments will be provided below in connection with FIGS. 6 and 7.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
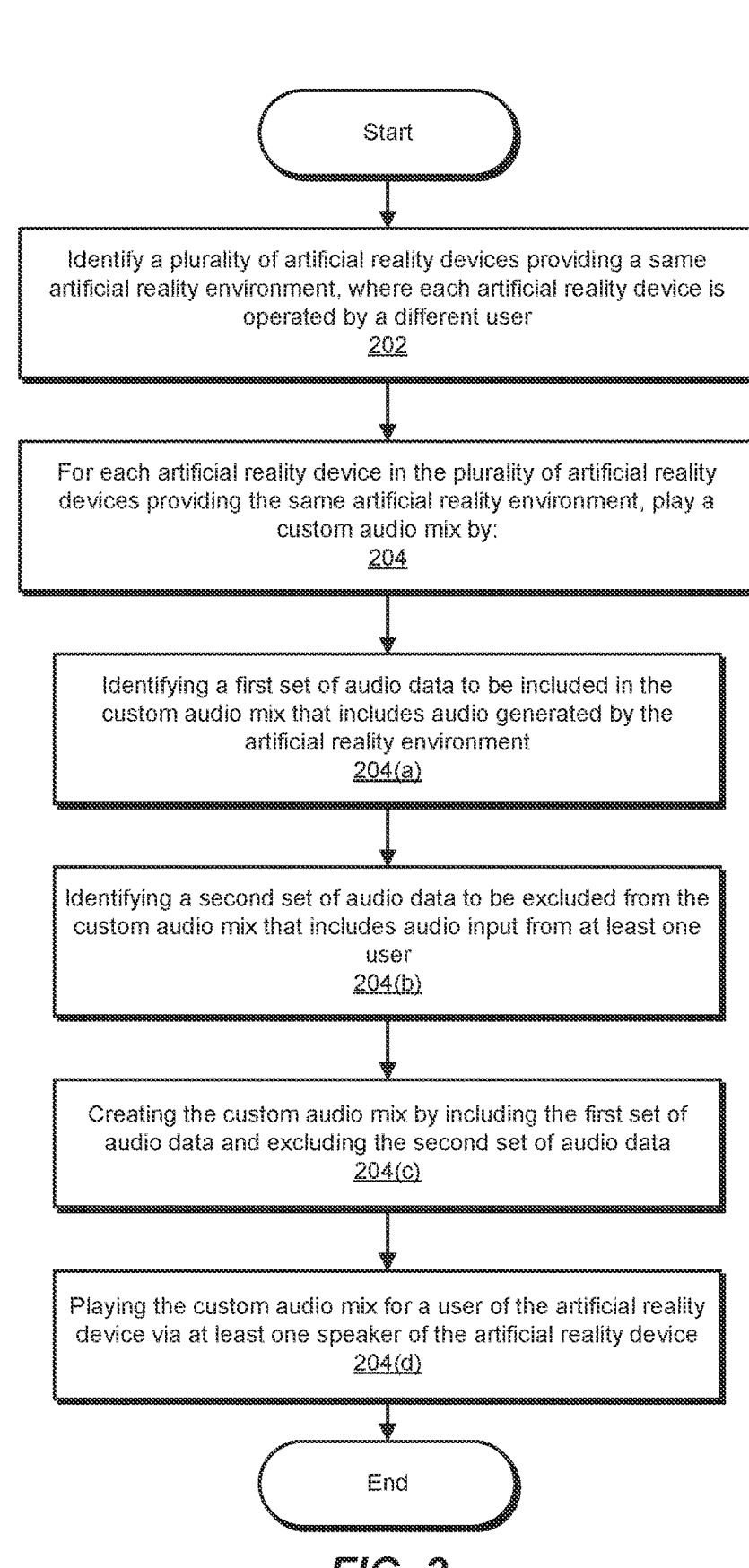
FIG. 2 is a flow diagram of an exemplary method for creating custom audio mixes for AR environments.

FIG. 2 is a flow diagram of an exemplary method 200 for creating custom audio mixes for AR environments. In some examples, at step 202, the systems described herein may identify a plurality of AR devices providing the same AR environment, where each AR device is operated by a different user.

The systems described herein may identify the AR devices in a variety of different contexts. In some examples, at least a portion of the AR devices may share the same physical location. The term physical location may generally refer to any physical area where users may be in hearing or visual distance of one another and/or may share the same local network. For example, a home, office, or park may all be examples of physical locations.

Figure 3:
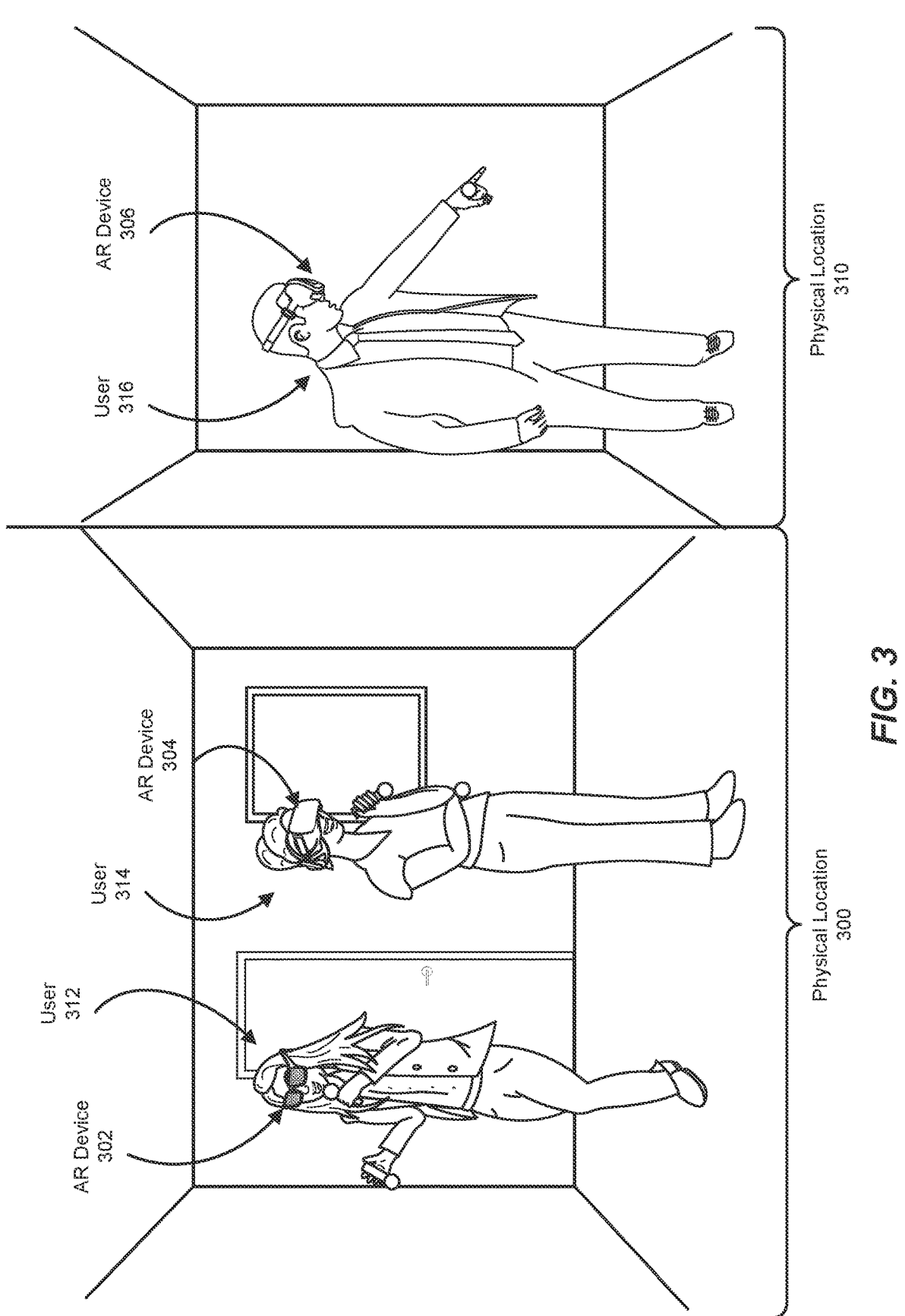
FIG. 3 is an illustration of users interacting with the same AR environment from different physical locations.

In some examples, some users may share a physical location while other users may be present in one or more different physical locations. For example, as illustrated in FIG. 3, an AR device 302 operated by a user 312 and/or an AR device 304 operated by a user 314 may share a physical location 300 while an AR device 306 operated by a user 316 may be in a different physical location 310. In one example, AR devices 302, 304, and 306 may all be presenting the same AR environment to users 312, 314, and 316. For example, users 312, 314, and 316 may be playing an AR game together, watching a movie together in an AR movie theater, or participating in an AR conference.

At step 204, the systems described herein may, for each AR device in the plurality of AR devices providing the same AR environment, play a custom audio mix by performing a sequence of sub-steps. At step 204 (*a*), the systems described herein may identify a first set of audio data to be included in the custom audio mix that includes audio generated by the AR environment.

The phrase "audio generated by the AR environment" may generally refer to any audio that originates within the AR environment as opposed to audio that is received as user input. For example, ambient sounds such as music in an AR environment may be audio generated by an AR environment. In another example, audio produced by virtual objects, such as the rushing of a virtual river or the barking of a virtual dog, may be audio produced by the AR environment. In one example, the soundtrack of a movie being viewed in an AR theater may be audio produced by the AR environment. By contrast, a user's voice captured by the microphone of a device and played within the AR environment may not be audio generated by the AR environment.

The systems described herein may identify audio to be included in a variety of ways. In some embodiments, the systems described herein may identify instances of audio generated by the AR environment to include as well as instances of audio generated by other users to include. For example, the systems described herein may identify ambient audio of the AR environment for inclusion in the custom mix. The term ambient audio may generally refer to any audio within an AR environment that permeates the environment or a portion of the environment rather than originating from a specific object within the environment. For example, background music may be ambient audio. In another example, bird noises and the sound of leaves rustling in the grass may be ambient audio in an outdoor AR environment that does not originate from any specific bird or leaf objects in the environment.

In some examples, the systems described herein may identify audio produced by an object within the artificial reality environment. The term object generally refers to any virtual object with an AR environment that has an audio component. In some examples, an object may be a volumetric object, such as a bird that produces a chirping noise at intervals. In other examples, an object may be a user interface element, such as a menu that produces a sound when a user selects an option. In some examples, an object may not have a visible or volumetric component but may be a purely audio effect, such as an "achievement completed" noise when a user completes an achievement in an AR game.

In some examples, identifying the audio produced by the object within the AR environment may include determining a relative positioning of the object and an avatar of the user of the AR within the AR environment and customizing an aspect of the audio produced by the object based on the relative positioning of the object and the avatar. For example, the systems described herein may scale the volume of the audio produced by the object relative to the distance between the object and the avatar, such that closer objects are louder and more distant objects are quieter. In another example, the systems described herein may direct the audio produced by the object to a different speaker in the user's AR device based on the relative positioning. For example, the systems described herein may direct audio produced by an object to the right of the avatar to a speaker in the right-side headphone of the AR device.

In some examples, the systems described herein may identify audio to include that is produced by other users who are interacting with the same AR environment. In one example, identifying the first set of audio data to be included in the custom audio mix may include determining that a remote AR device within the plurality of AR devices is not in the same physical location as the AR device and including audio input received by the remote AR device in response to determining that the remote AR device is not in the same physical location as the AR device. For example, returning to FIG. 3, the systems described herein may include audio produced by user 316 in location 310 in an audio mix created for AR device 302 in location 300 in response to determining that AR device 302 is remote from AR device 306 and/or user 316.

The systems described herein may determine that AR device 302 is remote from user 316 in a variety of ways. For example, the systems described herein may determine that AR device 306 operated by user 316 is connected to a different local network, geolocated at a different location (e.g., global positioning system coordinates and/or street address), and/or not within near-field communication range of AR device 302. Additionally or alternatively, the systems described herein may determine that a microphone of AR device 302 is not detecting audio produced by user 316. For example, user 312 and user 316 may be in the same house as one another with AR devices 302 and 306 connected to the same local network, but due to being in different rooms, users 312 and 316 may not be able to hear one another without their voices being conveyed via AR devices 302 and 306, respectively. In this example, the systems described herein may determine that AR devices 302 and 306 will be treated as remote from one another in response to being unable to detect user 312's voice at AR device 306 and/or user 316's voice at AR device 302. In some embodiments, the systems described herein may determine the relative positioning of AR devices in a physical location to a high degree of precision (e.g., within a few inches) in order to determine which user-produced audio to include or exclude in an audio mix for a given device.

Returning to FIG. 2, at step 204 (*b*), the systems described herein may identify a second set of audio data to be excluded from the custom audio mix that includes audio input from at least one user. The systems described herein may determine audio data to be excluded in a variety of ways.

The phrase "audio input from at least one user" generally refers to any sounds made by a user and captured by a microphone, such as speaking, singing, laughing, sighing, etc. In some examples, audio input from a user may include background noise captured by a microphone on a device operated by the user, such as traffic noise, other people in the same location talking, and so forth.

In one example, identifying the second set of audio data to be excluded from the custom audio mix that includes the audio input from the at least one user may include determining that the at least one user is in the same physical location as the AR device. The systems described herein may determine whether users and devices are in the same physical location using any or all of the techniques discussed above at step 204 (*a*) in conjunction with determining whether users and/or devices are remote from one another. Additionally or alternatively, the systems described herein may determine that two or more AR devices are in the same physical location if the devices are in line-of-sight of one another (e.g., via attempting to send line-of-sight-based messages, such as infrared pulses, between the devices). In one example, the systems described herein may determine that two devices are in the same physical location of one or more of the devices can detect audio produced by a user of one of the other devices. For example, returning to FIG. 3, the systems described herein may determine that AR device 302 and user 314 are in the same physical location because AR device 302 can detect audio produced by user 314. In another example, the systems described herein may determine that AR device 302 and user 314 are in the same physical location because AR device 302 is in line of sight of AR device 304 operated by user 314.

In some examples, the systems described herein may determine a relative physical positioning of a user and an AR device within a physical location. For example, if two users are within a large conference room, the systems described herein may determine that, because the users and their AR devices are at opposite ends of the very large room, the users may not be able to hear one another clearly and the systems described herein may therefore include audio from each of the users in the other's custom audio mix. In another example, the systems described herein may determine that two users are within several feet of one another and in response may exclude audio produced by each user from the other's custom audio mix.

Returning to FIG. 2, at step 204 (*c*), the systems described herein may create the custom audio mix by including the first set of audio data and excluding the second set of audio data. As discussed above, the systems described herein may include and exclude data based on various criteria. In addition, the systems described herein may perform various transformations on the audio to create the custom audio mix, such as adjusting a volume level of at least one channel of audio data within the first set of audio data.

Figure 4:
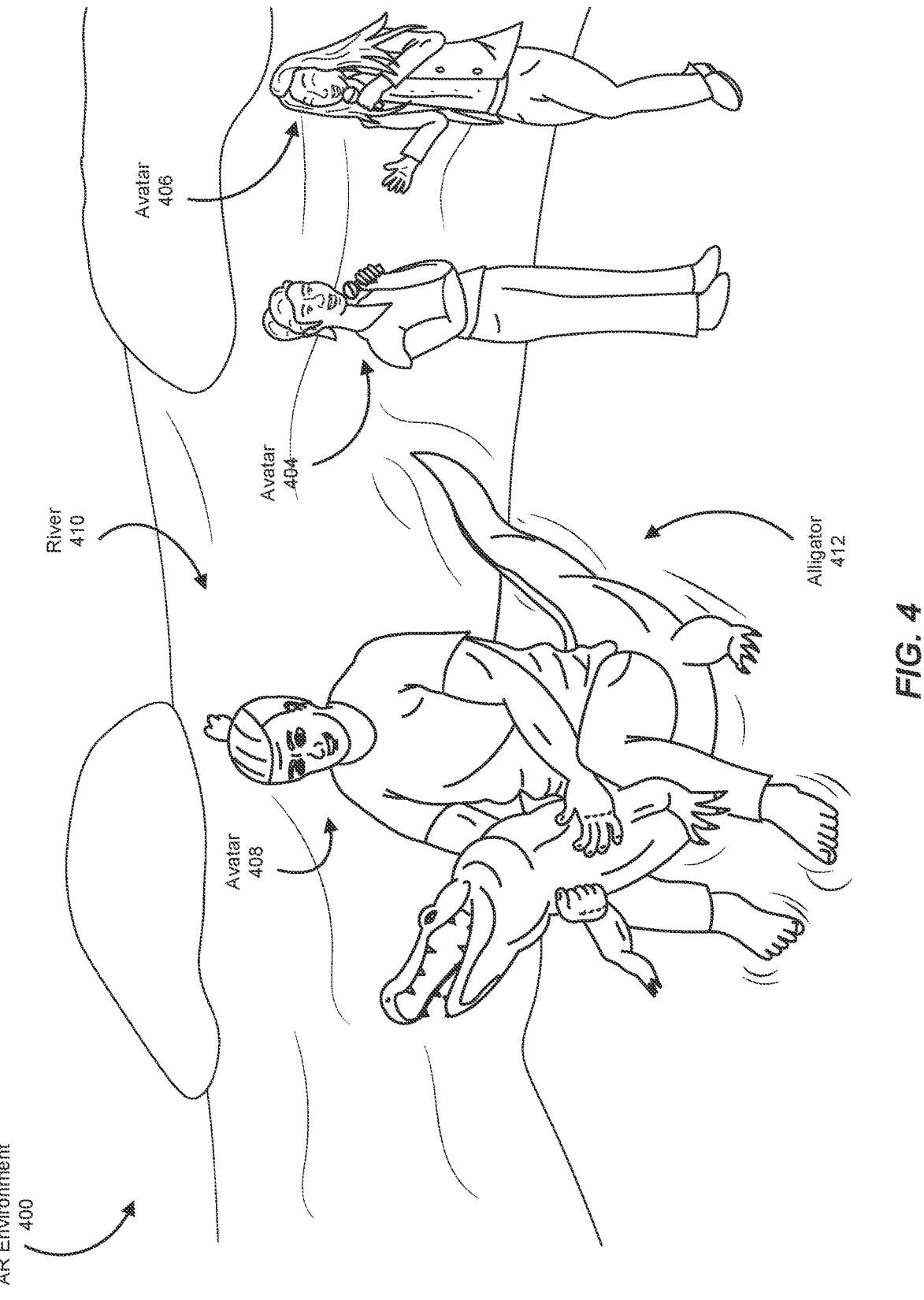
FIG. 4 is an illustration of an exemplary AR environment with multiple sources of audio.

For example, as illustrated in FIG. 4, an AR environment 400 may include avatars 404, 406, and/or 408 that each correspond to a different user playing an alligator wrestling game, as well as virtual objects such as an alligator 412 and a river 410. In one example, the systems described herein may include audio associated with avatar 404 in a custom audio mix for the user represented by avatar 406 but may not include audio with avatar 408 because avatar 408 may represent a user in the same room as the user represented by avatar 404. In another example, the systems described herein may not include audio associated with avatar 408 because the user represented by avatar 408 may be sending a private voice message to a different user rather than speaking publicly. In some examples, the systems described herein may increase the volume of audio produced by river 410 because avatar 404 is adjacent to river 410. Additionally, the systems described herein may designate audio produced by alligator 412 to be played out of a right-side headphone of the AR device worn by the user represented by avatar 404 because alligator 412 is to the right of avatar 404. If avatar 404 turns to face alligator 412 directly, the systems described herein may adjust the custom audio mix such that audio produced by alligator 412 is directed to both headphones.

Figures 5A, 5B:
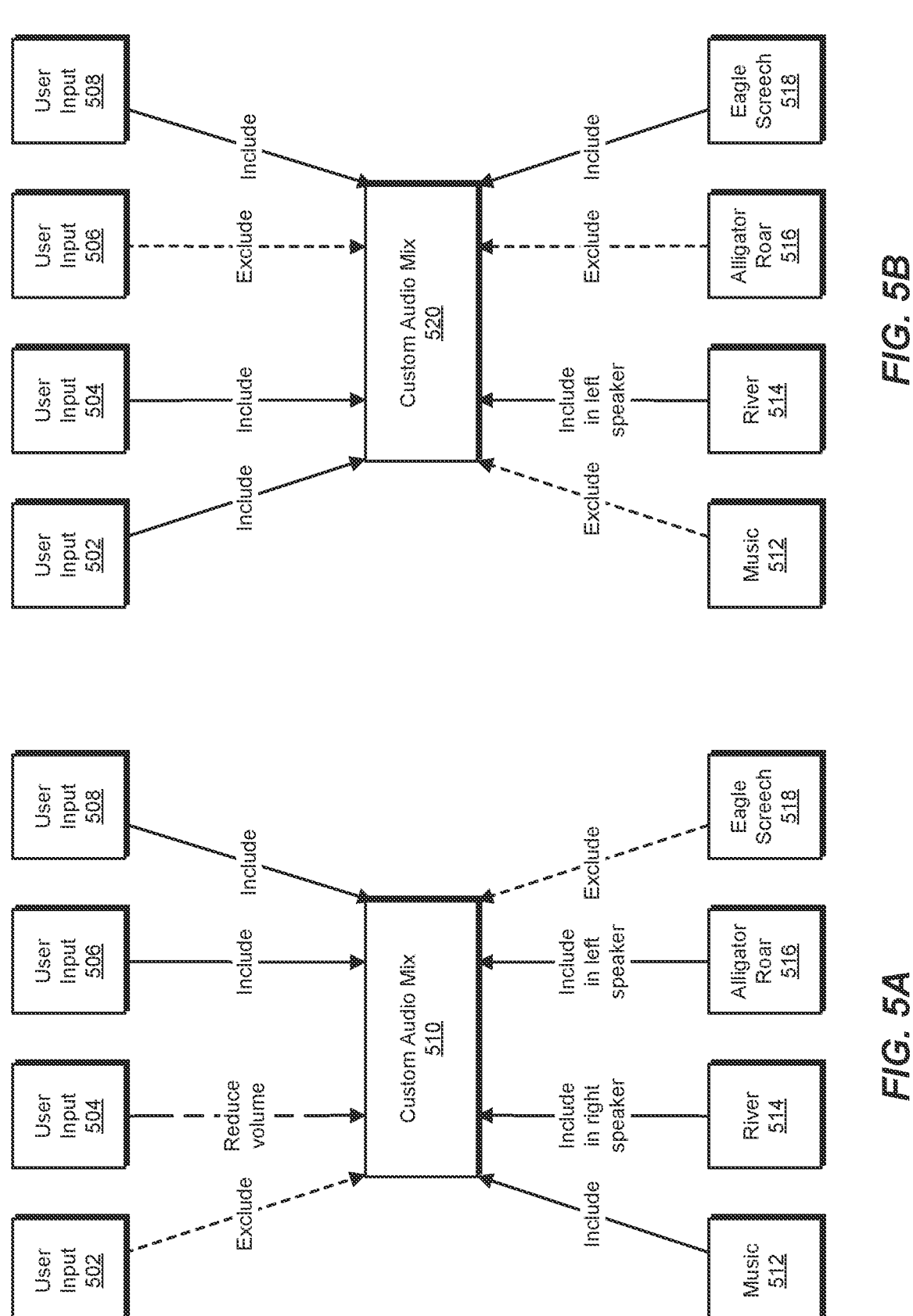
FIGS. 5A and 5B are illustrations of exemplary custom audio mixes.

In some embodiments, the systems described herein may create different custom audio mixes for different AR devices providing the same AR environment. For example, as illustrated in FIG. 5A, the systems described herein may create a custom audio mix 510 by evaluating a variety of different audio sources for inclusion. In one example, the systems described herein may exclude user input 502 due to that user being in physical proximity to the user for whom custom audio mix 510 is being created and may reduce the volume of user input 504 due to that user being in close enough physical proximity to potentially trigger feedback at a higher volume but not close enough physical proximity to be clearly heard in the physical space. In this example, the systems described herein may include user input 506 and 608 due to those users being remote. In one example, the systems described herein may include music 512 that is an ambient audio effect in the AR environment. The systems described herein may include audio from river 514 in a right headphone speaker and alligator roar 516 in a left headphone speaker due to a positioning of the user's avatar. In one example, the systems described herein may exclude an eagle screech 518 due to the user's avatar being located far away from the eagle in the AR environment.

Meanwhile, as illustrated in FIG. 5B, the systems described herein may create a custom audio mix 520 for a different AR device that may include, exclude, and transform audio elements differently than custom audio mix 510 despite both audio mixes being created for users participating in the same AR environment. For example, custom audio mix 520 may include user input 502, 504, and 508 due to those users being remote from the relevant user (i.e., the user operating the AR device for which custom audio mix 520 is being created) but may exclude user input 506 due to that user being local to the relevant user. In one example, the systems described herein may exclude music 512 due to the relevant user having a user preference setting that turns off ambient music. In some examples, the systems described herein may include audio from river 514 in the left headset speaker, exclude alligator roar 516, and include eagle screech 518 due to the relevant user's avatar having the river to its left, being distant from the alligator, and near to the eagle.

At step 204(*d*), the systems described herein may play the custom audio mix for a user of the AR device via at least one speaker of the AR device. In some embodiments, the AR device may include a headset, headphones, glasses with ear-adjacent speakers, and/or set of earbuds and the systems described herein may play audio through speakers that are configured to be heard by the user wearing the AR device and not by other users.

In some examples, playing the custom audio mix for the user of the AR device may include transmitting the custom audio mix to an additional device to be played via at least one speaker of the additional device. For example, a user may cast their AR device's custom audio mix to an additional device such as a television to be played through the television speakers. In some embodiments, transmitting the custom audio mix to the additional device may be in response to detecting that the user of the AR device has switched from operating the AR device to operating the additional device. For example, a user participating in an AR conference may take off their headset to participate from their laptop. In this example, the systems described herein may detect this change of device and transmit the custom audio mix to the laptop instead of the AR headset. If the user puts the headset back on, the systems described herein may resume playing the custom AR mix via the headset. The systems described herein may detect the device change in a number of ways, such as detecting which devices' sensors (e.g., microphone, keyboard, buttons, etc.) are receiving input from the user, visually locating the user via visual sensors of one or more devices, etc.

In some embodiments, the systems described herein may update the custom AR mix in response to changes in the physical or AR environment. For example, if the user moves to a different room, the systems described herein may re-determine which users' audio input to include and exclude. In another example, as the user moves through the AR environment, the systems described herein may change the volume, directionality, and inclusion or exclusion of sources of audio within the AR environment.

As described above, the systems and methods described herein may address the unique audio challenges of AR environments with multiple users in different physical locations by creating custom audio mixes for each user. Unlike audio for a typical conference call, which may include only audio produced by users, audio for an AR environment may include both local and remote users as well as various other audio elements such as ambient audio and audio produced by virtual objects that the systems described herein may include or exclude in a custom audio mix for each AR device providing the AR environment. By creating custom audio mixes in this way, the systems described herein may enable local users to share AR experiences with remote users without being subject to echoes or feedback.

Embodiments of the present disclosure may include or be implemented in conjunction with various types of artificial reality, virtual reality, and/or augmented reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
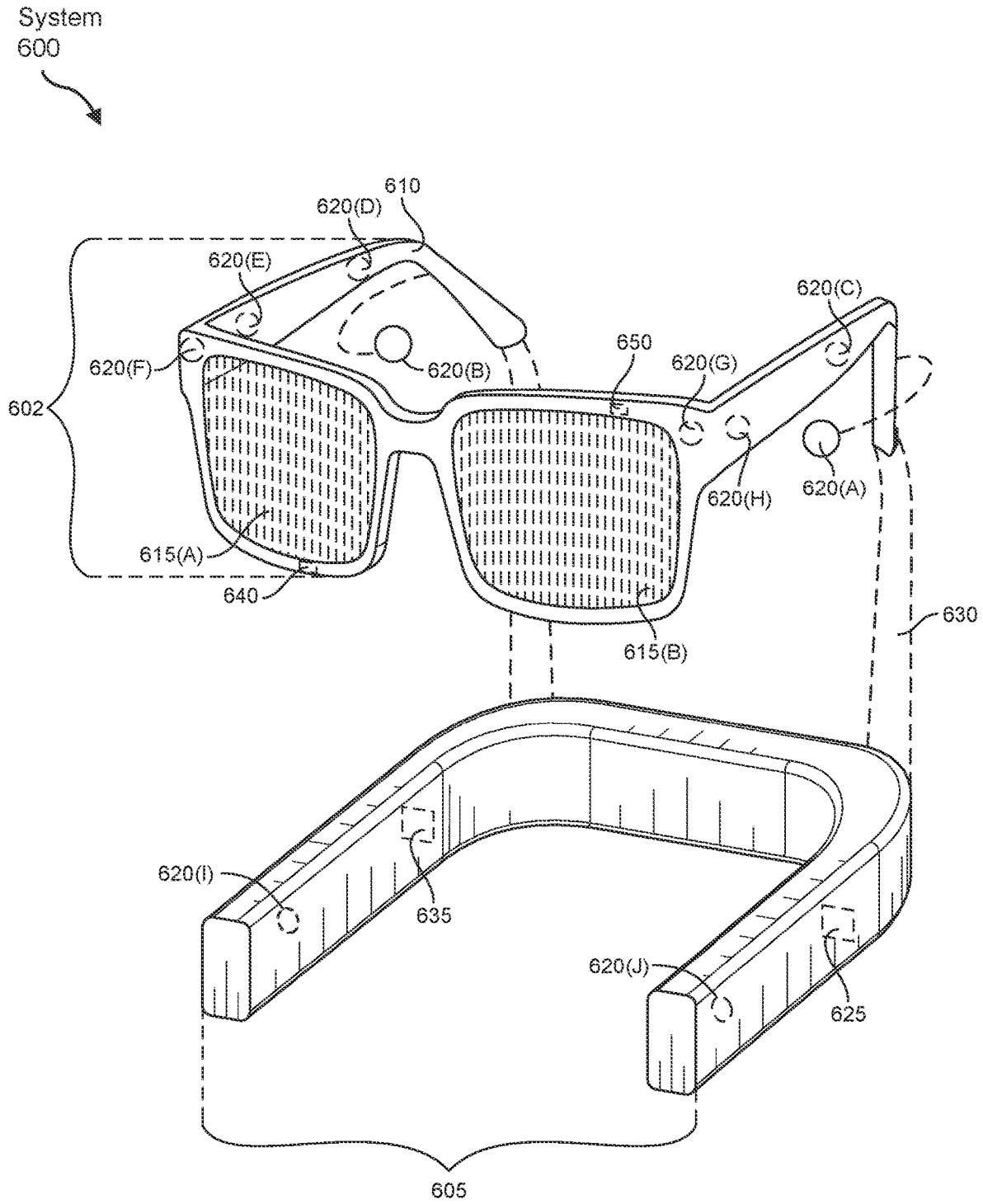
FIG. 6 is an illustration of exemplary augmented-reality glasses that may be used in connection with embodiments of this disclosure.
Figure 7:
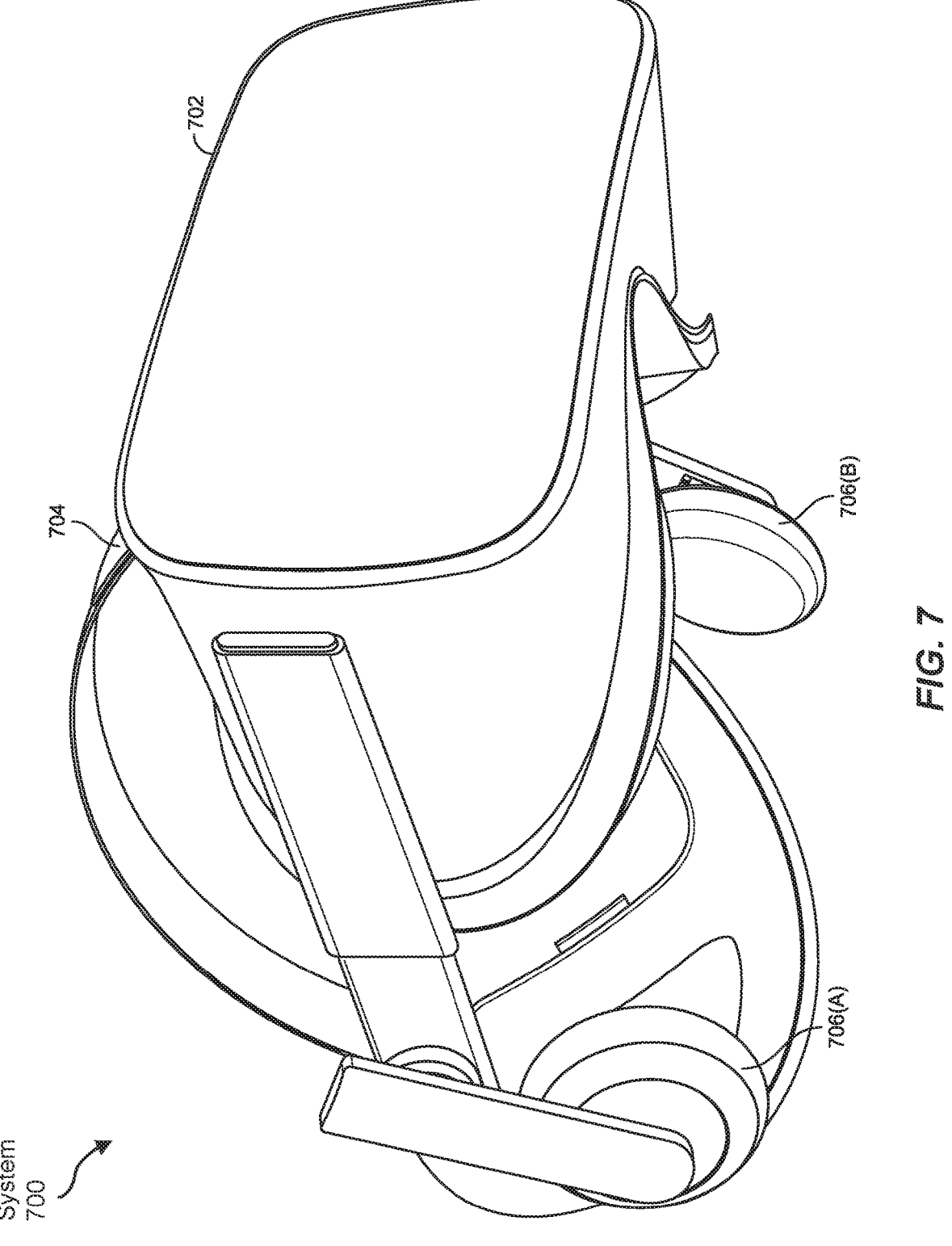
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-120(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620 (G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(1) and 620(J) of neckband 605 may be configured to detect sound and convert the detected sound into an electronic format (analog or digital). In the embodiment of FIG. 6, acoustic transducers 620(1) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620 (D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium-ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Artificial reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

Example Embodiments

Example 1: A computer-implemented method for creating custom audio mixes for artificial reality environments may include identifying a plurality of artificial reality devices providing the same artificial reality environment, where each artificial reality device is operated by a different use and, for each artificial reality device in the plurality of artificial reality devices providing the same artificial reality environment, playing a custom audio mix by (i) identifying a first set of audio data to be included in the custom audio mix that includes audio generated by the artificial reality environment, (ii) identifying a second set of audio data to be excluded from the custom audio mix that includes audio input from at least one user, (iii) creating the custom audio mix by including the first set of audio data and excluding the second set of audio data, and (iv) playing the custom audio mix for a user of the artificial reality device via at least one speaker of the artificial reality device.

Example 2: The computer-implemented method of example 1, where the plurality of artificial reality devices includes a plurality of head-mounted displays.

Example 3: The computer-implemented method of examples 1-2, where at least a portion of the plurality of artificial reality devices are located in a same physical location.

Example 4: The computer-implemented method of examples 1-3, where identifying the first set of audio data to be included in the custom audio mix that includes the audio generated by the artificial reality environment includes identifying ambient audio of the artificial reality environment.

Example 5: The computer-implemented method of examples 1-4, where identifying the first set of audio data to be included in the custom audio mix that includes the audio generated by the artificial reality environment includes identifying audio produced by an object within the artificial reality environment.

Example 6: The computer-implemented method of examples 1-5, where identifying the audio produced by the object within the artificial reality environment includes determining a relative positioning of the object and an avatar of the user of the artificial reality device within the artificial reality environment and customizing an aspect of the audio produced by the object based on the relative positioning of the object and the avatar.

Example 7: The computer-implemented method of examples 1-6, where identifying the first set of audio data to be included in the custom audio mix includes determining that a remote artificial reality device within the plurality of artificial reality devices is not in a same physical location as the artificial reality device and including audio input received by the remote artificial reality device in response to determining that the remote artificial reality device is not in the same physical location as the artificial reality device.

Example 8: The computer-implemented method of examples 1-7, where identifying the second set of audio data to be excluded from the custom audio mix that includes the audio input from the at least one user includes determining that the at least one user is in a same physical location as the artificial reality device.

Example 9: The computer-implemented method of examples 1-8, where identifying the second set of audio data to be excluded from the custom audio mix that includes the audio input from the at least one user includes determining a relative physical positioning of the at least one user and the artificial reality device within a physical location.

Example 10: The computer-implemented method of examples 1-9, where creating the custom audio mix by including the first set of audio data and excluding the second set of audio data includes adjusting a volume level of at least one channel of audio data within the first set of audio data.

Example 11: The computer-implemented method of examples 1-10, where playing the custom audio mix for the user of the artificial reality device includes transmitting the custom audio mix to an additional device to be played via at least one speaker of the additional device.

Example 12: The computer-implemented method of examples 1-11, where transmitting the custom audio mix to the additional device is in response to detecting that the user of the artificial reality device has switched from operating the artificial reality device to operating the additional device.

Example 13: A system for creating custom audio mixes for artificial reality environments may include at least one physical processor and physical memory including computer-executable instructions that, when executed by the physical processor, cause the physical processor identify a plurality of artificial reality devices providing the same artificial reality environment, where each artificial reality device is operated by a different use and, for each artificial reality device in the plurality of artificial reality devices providing the same artificial reality environment, play a custom audio mix by (i) identifying a first set of audio data to be included in the custom audio mix that includes audio generated by the artificial reality environment, (ii) identifying a second set of audio data to be excluded from the custom audio mix that includes audio input from at least one user, (iii) creating the custom audio mix by including the first set of audio data and excluding the second set of audio data, and (iv) playing the custom audio mix for a user of the artificial reality device via at least one speaker of the artificial reality device.

Example 14: The system of example 13, where the plurality of artificial reality devices includes a plurality of head-mounted displays.

Example 15: The system of examples 13-14, where at least a portion of the plurality of artificial reality devices are located in a same physical location.

Example 16: The system of examples 13-15, where identifying the first set of audio data to be included in the custom audio mix that includes the audio generated by the artificial reality environment includes identifying ambient audio of the artificial reality environment.

Example 17: The system of examples 13-16, where identifying the first set of audio data to be included in the custom audio mix that includes the audio generated by the artificial reality environment includes identifying audio produced by an object within the artificial reality environment.

Example 18: The system of examples 13-17, where identifying the audio produced by the object within the artificial reality environment includes determining a relative positioning of the object and an avatar of the user of the artificial reality device within the artificial reality environment and customizing an aspect of the audio produced by the object based on the relative positioning of the object and the avatar.

Example 19: The system of examples 13-18, where identifying the first set of audio data to be included in the custom audio mix includes: determining that a remote artificial reality device within the plurality of artificial reality devices is not in a same physical location as the artificial reality device; and including audio input received by the remote artificial reality device in response to determining that the remote artificial reality device is not in the same physical location as the artificial reality device.

Example 20: A non-transitory computer-readable medium may include one or more computer-readable instructions that, when executed by at least one processor of a computing device, cause the computing device to (i) identify a plurality of artificial reality devices providing the same artificial reality environment, where each artificial reality device is operated by a different use and, for each artificial reality device in the plurality of artificial reality devices providing the same artificial reality environment, play a custom audio mix by (i) identifying a first set of audio data to be included in the custom audio mix that includes audio generated by the artificial reality environment, (ii) identifying a second set of audio data to be excluded from the custom audio mix that includes audio input from at least one user, (iii) creating the custom audio mix by including the first set of audio data and excluding the second set of audio data, and (iv) playing the custom audio mix for a user of the artificial reality device via at least one speaker of the artificial reality device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive audio data to be transformed, transform the audio data by including certain audio channels while excluding other audio channels, output a result of the transformation to play audio for a user, use the result of the transformation to play audio for a user on one or more devices, and store the result of the transformation to create a recording of played audio. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for comprising:
identifying a plurality of artificial reality devices providing a same artificial reality environment, wherein each artificial reality device is operated by a different user; and
for each artificial reality device in the plurality of artificial reality devices providing the same artificial reality environment, playing a custom audio mix by:
identifying a first set of audio data to be included in the custom audio mix that comprises audio generated at least in part by determining a relative positioning of a virtual object and an avatar of a user of the artificial reality device within the artificial reality environment;
identifying a second set of audio data to be excluded from the custom audio mix that comprises audio input from at least one additional user by determining the relative positioning of the plurality of artificial reality devices by
determining whether the plurality of artificial reality devices are in a line-of-sight via sending infrared pulses between the plurality of artificial reality devices;
creating the custom audio mix by including the first set of audio data and excluding the second set of audio data; and
playing the custom audio mix for the user of the artificial reality device via at least one speaker of the artificial reality device.

2. The computer-implemented method of claim 1, wherein the plurality of artificial reality devices comprises a plurality of head-mounted displays.

3. The computer-implemented method of claim 1, further comprising spatializing audio corresponding to the virtual object based on the determined relative positioning of the virtual object to the avatar of the user.

4. The computer-implemented method of claim 1, wherein identifying the first set of audio data to be included in the custom audio mix that comprises the audio generated by the artificial reality environment comprises identifying ambient audio of the artificial reality environment.

5. The computer-implemented method of claim 1, wherein identifying the first set of audio data to be included in the custom audio mix comprises identifying audio produced by the virtual object within the artificial reality environment.

6. The computer-implemented method of claim 1, wherein:
determining a relative positioning of the virtual object and the avatar of the user of the artificial reality device within the artificial reality environment comprises
customizing an aspect of an audio produced by the virtual object by scaling a volume of the audio produced by the virtual object based on the relative positioning of the virtual object and the avatar.

7. The computer-implemented method of claim 1, wherein identifying the first set of audio data to be included in the custom audio mix comprises:
determining that a remote artificial reality device within the plurality of artificial reality devices is not in the physical location as the artificial reality device; and
including audio input received by the remote artificial reality device in response to determining that the remote artificial reality device is not in the physical location as the artificial reality device.

8. The computer-implemented method of claim 1, wherein identifying the second set of audio data to be excluded from the custom audio mix that comprises the audio input from the at least one additional user comprises determining that the at least one additional user is in the physical location as the artificial reality device.

9. The computer-implemented method of claim 1, wherein identifying the second set of audio data to be excluded from the custom audio mix that comprises the audio input from the at least one additional user comprises determining the relative positioning of the at least one additional user and the artificial reality device within the physical location.

10. The computer-implemented method of claim 1, wherein creating the custom audio mix by including the first set of audio data and excluding the second set of audio data comprises adjusting a volume level of at least one channel of audio data within the first set of audio data.

11. The computer-implemented method of claim 1, wherein playing the custom audio mix for the user of the artificial reality device comprises transmitting the custom audio mix to an additional device to be played via at least one speaker of the additional device.

12. The computer-implemented method of claim 11, wherein transmitting the custom audio mix to the additional device is in response to detecting that the user of the artificial reality device has switched from operating the artificial reality device to operating the additional device.

13. A system comprising:
at least one physical processor; and
physical memory comprising computer-executable instructions that, when executed by the physical processor, cause the physical processor to:
identify a plurality of artificial reality devices providing a same artificial reality environment, wherein each artificial reality device is operated by a different user; and
for each artificial reality device in the plurality of artificial reality devices providing the same artificial reality environment, play a custom audio mix by:
identifying a first set of audio data to be included in the custom audio mix that comprises audio generated at least in part by determining a relative positioning of a virtual object and an avatar of a user of the artificial reality device within the artificial reality environment;

identifying a second set of audio data to be excluded from the custom audio mix that comprises audio input from at least one additional user by determining the relative positioning of the plurality of artificial reality devices by determining whether the plurality of artificial reality devices are in a line-of-sight via sending infrared pulses between the plurality of artificial reality devices;

creating the custom audio mix by including the first set of audio data and excluding the second set of audio data; and playing the custom audio mix for the user of the artificial reality device via at least one speaker of the artificial reality device.

14. The system of claim 13, wherein the plurality of artificial reality devices comprises a plurality of head-mounted displays.

15. The system of claim 13, further comprising spatializing audio corresponding to the virtual object based on the determined relative positioning of the virtual object to the avatar of the user.

16. The system of claim 13, wherein identifying the first set of audio data to be included in the custom audio mix that comprises the audio generated by the artificial reality environment comprises identifying ambient audio of the artificial reality environment.

17. The system of claim 13, wherein identifying the first set of audio data to be included in the custom audio mix comprises identifying audio produced by the virtual object within the artificial reality environment.

18. The system of claim 13, wherein:

determining a relative positioning of the virtual object and the avatar of the user of the artificial reality device within the artificial reality environment comprises customizing an aspect of an audio produced by scaling a volume of the audio produced by the virtual object based on the relative positioning of the virtual object and the avatar.

19. The system of claim 13, wherein identifying the first set of audio data to be included in the custom audio mix comprises:

determining that a remote artificial reality device within the plurality of artificial reality devices is not in the physical location as the artificial reality device; and including audio input received by the remote artificial reality device in response to determining that the remote artificial reality device is not in the physical location as the artificial reality device.

20. A non-transitory computer-readable medium comprising one or more computer-readable instructions that, when executed by at least one processor of a computing device, cause the computing device to:

identify a plurality of artificial reality devices providing a same artificial reality environment, wherein each artificial reality device is operated by a different user; and for each artificial reality device in the plurality of artificial reality devices providing the same artificial reality environment, play a custom audio mix by:

identifying a first set of audio data to be included in the custom audio mix that comprises audio generated at least in part by determining a relative positioning of a virtual object and an avatar of a user of the artificial reality device within the artificial reality environment;

identifying a second set of audio data to be excluded from the custom audio mix that comprises audio input from at least one additional user by determining the relative positioning of the plurality of artificial reality devices by determining whether the plurality of artificial reality devices are in a line-of-sight via sending infrared pulses between the plurality of artificial reality devices;

creating the custom audio mix by including the first set of audio data and excluding the second set of audio data; and playing the custom audio mix for the user of the artificial reality device via at least one speaker of the artificial reality device;

and by determining a relative positioning of the plurality of artificial reality devices in a physical location.

* * * * *